United States Patent
Beezer et al.

(10) Patent No.: US 6,957,233 B1
(45) Date of Patent: Oct. 18, 2005

(54) METHOD AND APPARATUS FOR CAPTURING AND RENDERING ANNOTATIONS FOR NON-MODIFIABLE ELECTRONIC CONTENT

(75) Inventors: John L. Beezer, Redmond, WA (US); Marco A. DeMello, Redmond, WA (US); Jerry J. Dunietz, Seattle, WA (US); Leroy B. Keely, Portola Valley, CA (US); Vikram Madan, Bellevue, WA (US); David M. Silver, Redmond, WA (US); Charles P. Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/455,806

(22) Filed: Dec. 7, 1999

(51) Int. Cl.⁷ .............................................. G06F 17/30
(52) U.S. Cl. ...................... 707/200; 345/179; 345/711
(58) Field of Search ................................ 707/200, 500; 345/179, 711

(56) References Cited

U.S. PATENT DOCUMENTS

| | | |
|---|---|---|
| 5,239,466 A | 8/1993 | Morgan et al. |
| RE34,476 E | 12/1993 | Norwood ..................... 382/186 |

(Continued)

FOREIGN PATENT DOCUMENTS

| | | |
|---|---|---|
| EP | 0 902 379 A2 | 3/1999 |
| WO | WO 87/01481 | 3/1987 |
| WO | WO 96/20908 | 7/1996 |
| WO | WO 98/09446 | 3/1998 |

OTHER PUBLICATIONS

"Adobe Acrobat 3.0 Reader Online Guide", Adobe Systems, Inc., pp. 1–110.

SOFTBOOK® Press, The Leader in Internet–Enabled Document Distribution and Reading Systems; 1999, http://www.softbook.com/consumer/reader.asp.

Rocket eBook Using the Rocket eBook; 1999, http://www.rocketbook.com/Products/Faq/using.html.

(Continued)

*Primary Examiner*—Uyen Le
*Assistant Examiner*—Hanh Thai
(74) *Attorney, Agent, or Firm*—Banner & Witcoff, Ltd.

(57) ABSTRACT

A system and method for capturing annotations for a non-modifiable document is disclosed. Once it is determined that an annotation is to be created, the system determines the file position of the selected object. The file position of the selected object is stored along with the created annotation in another file or a non-read only portion of a file storing the document. Using the file position, the annotation may be properly identified with the selected object without modifying the non-modifiable document.

22 Claims, 9 Drawing Sheets

U.S. PATENT DOCUMENTS

| | | |
|---|---|---|
| 5,347,295 A | 9/1994 | Agulnick et al. |
| 5,434,965 A | 7/1995 | Matheny et al. |
| 5,471,568 A | 11/1995 | Webb et al. ................ 382/199 |
| 5,473,742 A | 12/1995 | Polyakov et al. |
| 5,557,722 A * | 9/1996 | DeRose et al. ............. 715/513 |
| 5,559,942 A | 9/1996 | Gough et al. |
| 5,572,643 A | 11/1996 | Judson |
| 5,625,833 A | 4/1997 | Levine et al. |
| 5,630,125 A | 5/1997 | Zellweger |
| 5,632,022 A | 5/1997 | Warren et al. |
| 5,680,636 A | 10/1997 | Levine et al. ............... 715/512 |
| 5,687,331 A | 11/1997 | Volk et al. |
| 5,689,717 A | 11/1997 | Pritt |
| 5,717,860 A | 2/1998 | Graber et al. |
| 5,717,879 A | 2/1998 | Moran |
| 5,719,595 A | 2/1998 | Hoddie et al. .............. 345/611 |
| 5,727,129 A | 3/1998 | Barrett et al. ................. 706/10 |
| 5,729,687 A * | 3/1998 | Rothrock et al. ........... 709/204 |
| 5,737,599 A * | 4/1998 | Rowe et al. .................. 707/10 |
| 5,745,116 A | 4/1998 | Pisutha-Arnond |
| 5,790,818 A | 8/1998 | Martin |
| 5,799,268 A * | 8/1998 | Boguraev ...................... 704/9 |
| 5,801,687 A | 9/1998 | Peterson et al. |
| 5,802,516 A | 9/1998 | Shwarts et al. |
| 5,819,301 A | 10/1998 | Rowe et al. |
| 5,821,925 A | 10/1998 | Casey et al. |
| 5,822,720 A | 10/1998 | Bookman et al. .............. 204/3 |
| 5,832,263 A * | 11/1998 | Hansen et al. .............. 709/322 |
| 5,835,092 A | 11/1998 | Boudreau et al. |
| 5,838,313 A | 11/1998 | Hou et al. |
| 5,838,914 A | 11/1998 | Carleton et al. ............ 709/204 |
| 5,845,262 A | 12/1998 | Nozue et al. |
| 5,854,630 A | 12/1998 | Nielsen |
| 5,860,074 A | 1/1999 | Rowe et al. |
| 5,862,395 A | 1/1999 | Bier |
| 5,877,757 A | 3/1999 | Baldwin et al. |
| 5,893,132 A | 4/1999 | Huffman et al. ............ 715/532 |
| 5,918,236 A | 6/1999 | Wical |
| 5,920,694 A | 7/1999 | Carleton et al. |
| 5,931,912 A | 8/1999 | Wu et al. |
| 5,933,139 A | 8/1999 | Feigner et al. |
| 5,933,140 A | 8/1999 | Strahorn et al. |
| 5,940,080 A | 8/1999 | Ruehle et al. .............. 345/611 |
| 5,948,040 A | 9/1999 | DeLorme et al. |
| 5,950,214 A | 9/1999 | Rivette et al. |
| 5,956,034 A | 9/1999 | Sachs et al. |
| 5,978,818 A | 11/1999 | Lin |
| 5,986,665 A | 11/1999 | Wrey et al. |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,344 A | 1/2000 | Harada et al. |
| 6,018,742 A * | 1/2000 | Herbert, III ................. 707/102 |
| 6,034,689 A | 3/2000 | White et al. |
| 6,035,330 A | 3/2000 | Astiz et al. |
| 6,037,934 A | 3/2000 | Himmel et al. |
| 6,038,598 A | 3/2000 | Danneels |
| 6,049,812 A | 4/2000 | Bertram et al. |
| 6,052,514 A | 4/2000 | Gill et al. |
| 6,054,990 A * | 4/2000 | Tran ........................... 345/863 |
| 6,072,490 A | 6/2000 | Bates et al. |
| 6,076,917 A | 6/2000 | Wen |
| 6,081,829 A | 6/2000 | Sidana |
| 6,088,481 A | 7/2000 | Okamoto et al. |
| 6,091,930 A | 7/2000 | Mortimer et al. |
| 6,094,197 A | 7/2000 | Buxton et al. |
| 6,105,044 A | 8/2000 | DeRose et al. |
| 6,118,437 A | 9/2000 | Fleck et al. |
| 6,122,649 A | 9/2000 | Kanerva et al. |
| 6,128,007 A | 10/2000 | Seybold |
| 6,133,925 A | 10/2000 | Jaremko et al. |
| 6,144,991 A | 11/2000 | England ...................... 709/205 |
| 6,154,771 A | 11/2000 | Rangan et al. |
| 6,157,381 A | 12/2000 | Bates et al. |
| 6,163,778 A | 12/2000 | Fogg et al. |
| 6,181,344 B1 | 1/2001 | Tarpenning et al. |
| 6,184,886 B1 | 2/2001 | Bates et al. |
| 6,195,679 B1 | 2/2001 | Bauersfeld et al. |
| 6,195,694 B1 | 2/2001 | Chen et al. ................. 709/220 |
| 6,199,082 B1 | 3/2001 | Ferrel et al. ................. 715/522 |
| 6,205,455 B1 | 3/2001 | Umen et al. |
| 6,211,871 B1 | 4/2001 | Himmel et al. |
| 6,230,171 B1 | 5/2001 | Pacifici et al. |
| 6,239,792 B1 | 5/2001 | Yanagisawa et al. |
| 6,243,071 B1 | 6/2001 | Shwarts et al. |
| 6,243,091 B1 | 6/2001 | Berstis |
| 6,262,719 B1 | 7/2001 | Bi et al. |
| 6,266,772 B1 | 7/2001 | Suzuki |
| 6,271,840 B1 | 8/2001 | Finseth et al. |
| 6,279,005 B1 | 8/2001 | Zellweger |
| 6,279,014 B1 | 8/2001 | Schilit et al. |
| 6,289,362 B1 * | 9/2001 | Van Der Meer ......... 715/501.1 |
| 6,301,590 B1 | 10/2001 | Siow et al. |
| 6,321,244 B1 | 11/2001 | Liu et al. |
| 6,331,867 B1 | 12/2001 | Eberhard et al. |
| 6,335,727 B1 | 1/2002 | Morishita et al. |
| 6,340,967 B1 | 1/2002 | Maxted |
| 6,356,287 B1 | 3/2002 | Ruberry et al. |
| 6,369,811 B1 | 4/2002 | Graham et al. |
| 6,370,497 B1 | 4/2002 | Knowles |
| 6,377,983 B1 | 4/2002 | Cohen et al. |
| 6,389,434 B1 | 5/2002 | Rivette et al. |
| 6,393,422 B1 | 5/2002 | Wone |
| 6,397,264 B1 | 5/2002 | Stasnick et al. |
| 6,405,221 B1 | 6/2002 | Levine et al. |
| 6,421,065 B1 | 7/2002 | Walden et al. |
| 6,425,525 B1 | 7/2002 | Swaminathan et al. |
| 6,437,793 B1 | 8/2002 | Kaasila |
| 6,446,110 B1 | 9/2002 | Lection et al. |
| 6,457,013 B1 | 9/2002 | Saxton et al. |
| 6,460,058 B2 | 10/2002 | Koppolu et al. |
| 6,484,156 B1 | 11/2002 | Gupta et al. |
| 6,486,895 B1 | 11/2002 | Robertson et al. ........... 345/776 |
| 6,490,603 B1 | 12/2002 | Keenan et al. |
| 6,529,920 B1 | 3/2003 | Arons et al. |
| 6,535,294 B1 | 3/2003 | Arledge, Jr. et al. |
| 6,539,370 B1 | 3/2003 | Chang et al. |
| 6,549,220 B1 | 4/2003 | Hsu et al. ................... 345/854 |
| 6,560,621 B2 | 5/2003 | Barile |
| 6,571,211 B1 | 5/2003 | Dwyer et al. |
| 6,571,295 B1 | 5/2003 | Sidana |
| 6,585,776 B1 | 7/2003 | Bates et al. |
| 6,647,534 B1 | 11/2003 | Graham |
| 6,697,997 B1 | 2/2004 | Fujimura |
| 6,760,884 B1 | 7/2004 | Vertelney et al. |
| 2001/0031128 A1 | 10/2001 | Manbeck |
| 2002/0097261 A1 | 7/2002 | Gottfurcht et al. |
| 2002/0099552 A1 | 7/2002 | Rubin et al. |

OTHER PUBLICATIONS

Explore the Features of the Rocket eBook; wysiwyg://212http://www.rocketbook.com/Products/Tour/index.html.

Crespo, Chang, and Bier, "Responsive interaction for a large Web application: the meteor shower architecture in the WebWriter II Editor", Computer Networks and ISDN Systems, pp. 1508–1517.

Kunikazu, T., Patent Abstracts of Japan, Publication No. 11327789 for Color Display and Electronic Blackboard System, published Nov. 30, 1999.

Open eBook Forum, Open eBook™ Publication Structure 1.0, Sep. 1999, http://www.ebxwg.org/oebps/oebps1.0/download/oeb1–oebps.htm.

Kristensen, A., "Formsheets and the XML Forms Language" (Mar. 1999).

Dublin Core Resource Types: Structurality DRAFT: Jul. 24, 1997, Feb. 27, 1998.

Dublin Core Metadata Element Set, Version 1.1: Reference Description 1999.

Dublin Core Metadata Initiative: User Guide Working Draft Jul. 31, 1998, 1999.

Computer Networks and ISDN Systems "Responsive interaction for a large Web application: the meteor shower architecture in the WebWriter II Editor"; 1997, pp. 1508–1517.

Hirotsu et al., "Cmew/U—A Multimedia Web Annotation Sharing System", NTT Network Innovation Laboratories—Japan, IEEE, 1999, pp. 356–359.

Kuo et al., "A Synchronization Scheme for Multimedia Annotation", Multimedia Information Networking Laboratory, Tamkang University—Taiwan, IEEE, 1997, pp. 594–598.

Aha! InkWriter□ The simplicity of pen and paper, the power of word processing., Advertisement, 1993, 2 pp., aha! software corporation, Mountain View, CA.

Aha! InkWriter□ for Magic Cap "The fastest, most convenient way to create faxes, notes and messages." Advertisement, 1993, 1994, 2 pp., aha! software corporation, Mountain View, CA.

Aha! 2.0 for Windows InkWriter□ The power of word processing, the convenience of pen and paper, Advertisement, 1994, 1995, 2 pp., aha! software corporation, Mountain View, CA.

Aha! software products, Web Page List of Products, Sep. 24, 1997, pp. 1–5, aha! software corporation, Mountain View, CA.

* cited by examiner

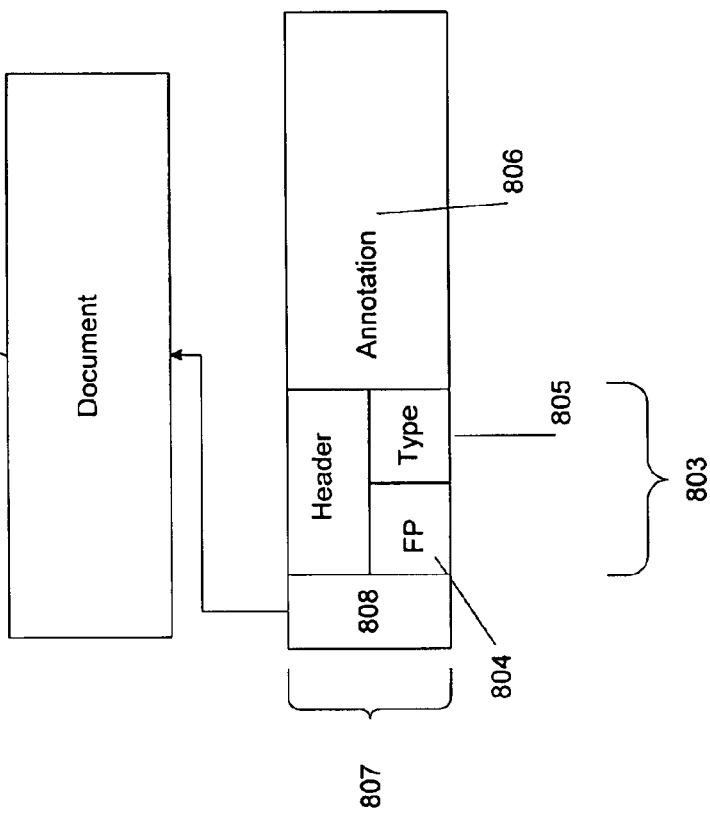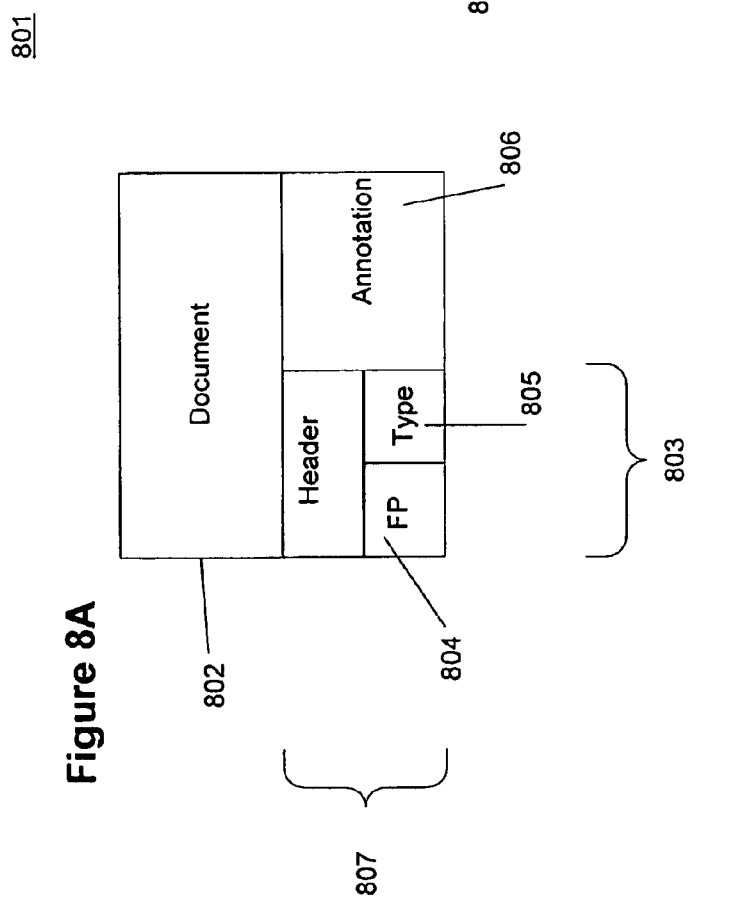

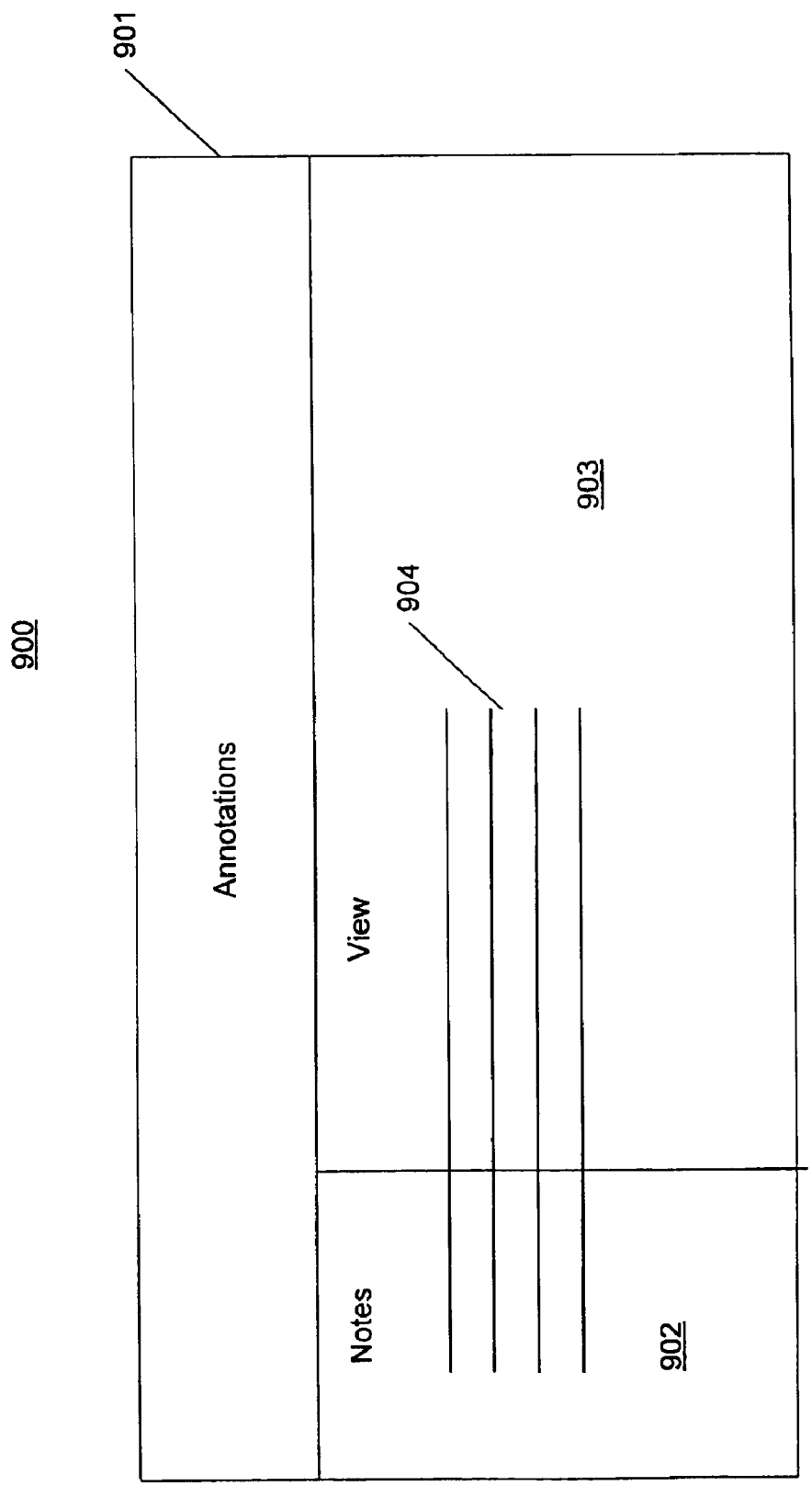

METHOD AND APPARATUS FOR CAPTURING AND RENDERING ANNOTATIONS FOR NON-MODIFIABLE ELECTRONIC CONTENT

RELATED APPLICATIONS

This application is related to the following applications filed herewith:

U.S. Ser. No. 09/456,127, filed Dec. 7, 1999, entitled "Bookmarking and Placemarking a Displayed Document in a Computer System;"

U.S. Ser. No. 09/455,754, filed Dec. 7, 1999, entitled "Method and Apparatus Installing and Using Reference Materials In Conjunction With Reading Electronic Content;"

U.S. Ser. No. 09/455,807, filed Dec. 7, 1999, entitled "Method and Apparatus for Capturing and Rendering Text Annotations For Non-Modifiable Electronic Content;"

U.S. Ser. No. 09/455,808 filed Dec. 7, 1999 entitled "system, Method, and User Interface for Active Reading of Electronic Content;" and U.S. Ser. No. 09/455,805, filed Dec. 7, 1999, entitled "system and Method for Annotating an Electronic Document Independently of Its Content."

BACKGROUND

1. Technical Field

The disclosure generally relates to the electronic display of documents. More particularly, the disclosure relates to the placement and use of annotations in electronically displayed documents.

2. Related Art

Many factors today drive the development of computers and computer software. One of these factors is the desire to provide accessibility to information virtually anytime and anywhere. The proliferation of notebook computers, personal digital assistants (PDAs), and other personal electronic devices reflect the fact that users want to be able to access information wherever they may be, whenever they want. In order to facilitate greater levels of information accessibility, the presentation of information must be made as familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if the machines have greater capabilities and provide more content to the user beyond the user's expectations. Once users feel comfortable with new electronic presentations, they will be more likely to take advantage of an entire spectrum of available functionality.

One manner of encouraging familiarity is to present information in an electronic book format in which a computer displays information in a manner that closely resembles printed books. In order to more completely mimic a printed book, users will need to have the ability to make textual notes to themselves, akin to writing in the margins of paper books. Users will also want to highlight selected portions, as these are active-reading activities of which a user would expect to see in an electronic book. Users will want to add drawings, arrows, underlining, strike-throughs, and the like, also akin to writing in paper books. Finally, users will want to add bookmarks.

The above-identified so-called "active-reading" activities are available. However, all of these active-reading activities require modification of the underlying document. For example, as is known in the art, if one adds a comment or annotation in an electronic editor, the comment or annotation is inserted into the document. This insertion corrupts the underlying document from its pre-insertion, pristine state. While this may not be an issue in an editable document, the modification of a copyrighted document may run afoul of various copyright provisions. The violations may be compounded with the forwarding of the document to another in its modified state. Further, irrespective of any copyright transgressions, publishing houses responsible for the distribution of the underlying text may not be pleased with any ability to modify their distributed and copyrighted works.

Thus, the users' desire to actively read and annotate works clashes with the goals of publishing houses to keep copyrighted works in their unmodified state. Without solution of this dilemma, the growth of the electronic publishing industry may be hampered, on one hand, by readers who refuse to purchase electronic books because of the inability to annotate read-only documents and, on the other hand, by the publishing industry that refuses to publish titles that allow for annotations that destroy the pristine compilation of the electronic works.

SUMMARY

The present invention provides a technique for annotating an electronic document without corruption of the document itself. In the context of the present invention, a "document" encompasses all forms of electronically displayable information including but not limited to books, manuals, reference materials, picture books, etc. To create an annotation, a user selects an object in the document to locate where the annotation is to be placed. The computer system determines which object has been selected and determines a file position associated with the selected object. The user adds the annotation and, eventually, returns to reading the document. The annotations may be filtered, navigated, sorted, and indexed per user input. Annotations may include text annotations, drawings, highlights, bookmarks, and the like as is related to the general field of active reading.

In the context of the present invention, a displayed "object" may include text, graphics, equations, and other related elements as contained in the displayed document. Annotations may include highlighting, adding textual notes, adding drawings (as one would expect to do with a pencil or pen to a paper book), and adding bookmarks. While the annotations are to be displayed in conjunction with the document, the underlying document is not modified. Related annotations are described in the following disclosures:

U.S. Ser. No. 09/456,127, filed Dec. 7, 1999, entitled "Bookmarking and Placemarking a Displayed Document in a Computer System;"

U.S. Ser. No. 09/455,754, filed Dec. 7, 1999, entitled "Method and Apparatus for Installing and Using Reference Materials In Conjunction With Reading Electronic Content;"

U.S. Ser. No. 09/455,807, filed Dec. 7, 1999, entitled "Method and Apparatus for Capturing and Rendering Text Annotations For Non-Modifiable Electronic Content;"

U.S. Ser. No. 09/455,808, filed Dec. 7, 1999, entitled "System, Method, and User Interface for Active Reading of Electronic Content;" and U.S. Ser. No. 09/455,805, filed Dec. 7, 1999, entitled "System and Method for Annotating an Electronic Document Independently of Its Content,"

which are incorporated herein by reference in their entireties for any enabling disclosure.

To associate an annotation with a selected object, the annotations are linked to a file position in the non-modifiable document. The invention calculates the file position of, for example, the first character of the word (or other displayed element) and stores the file position with the annotation in a separate, linked local file. Alternatively, the non-modifiable document may represent a non-modifiable portion of a file, with the annotations being added to a write-enabled portion of the file.

The determined file position may be used for direct random access into the non-modifiable document despite the document being compressed or decompressed. In one embodiment, the file position is specified in a UTF-8 (a known textual storage format) document derived from an original Unicode (another known textual storage format). However, in order to conserve space, the non-modifiable document may be compressed using a general-purpose binary compression algorithm, decompressed, and translated to Unicode for viewing. Accordingly, the file position as stored for an annotation is consistent through various storage schemes and compression techniques.

These and other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF DRAWINGS

FIGS. 8A and 8B show various storage techniques for storing annotations in accordance with embodiments of the present invention.

FIG. 9 shows a screen for manipulating annotations in accordance with embodiments of the present invention.

DETAILED DESCRIPTION

The present invention relates to a system and method for capturing annotations associated with a non-modifiable document.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

Figure 1:
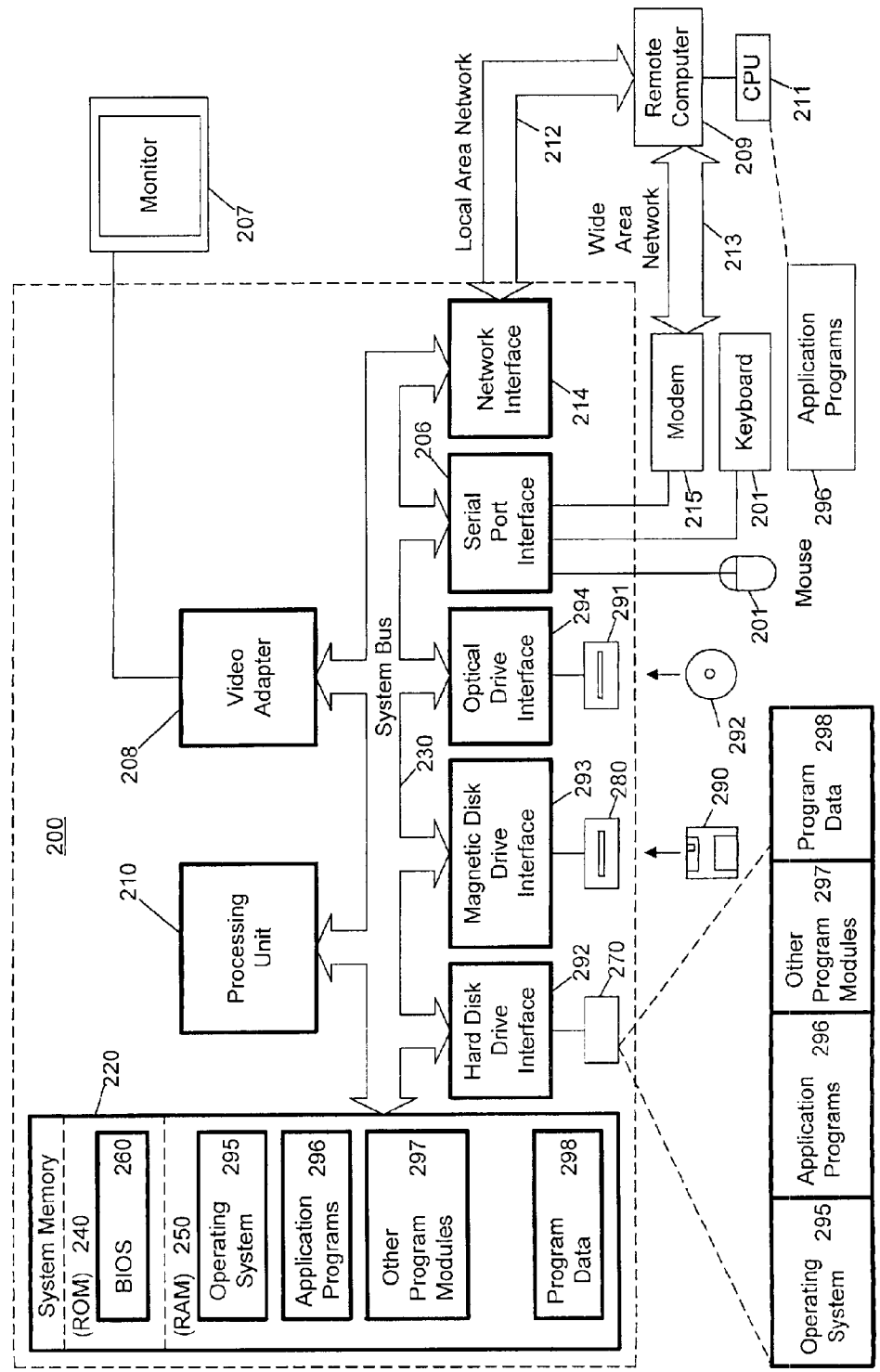
FIG. 1 shows a general purpose computer supporting the display and annotation of an electronic document in accordance with embodiments of the present invention.

FIG. 1 is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

In addition to the system described in relation to FIG. 1, the invention may be practiced on a handheld computer. Further, purpose-built devices may support the invention as well. In short, handheld computers and purpose-built devices are similar in structure to the system of FIG. 1 but may be limited to a display (which may be touch-sensitive to a human finger or stylus), memory (including RAM and ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. The invention may be practiced using C. Also, it is appreciated that other languages may be used including C++, assembly language, and the like.

Figure 2:
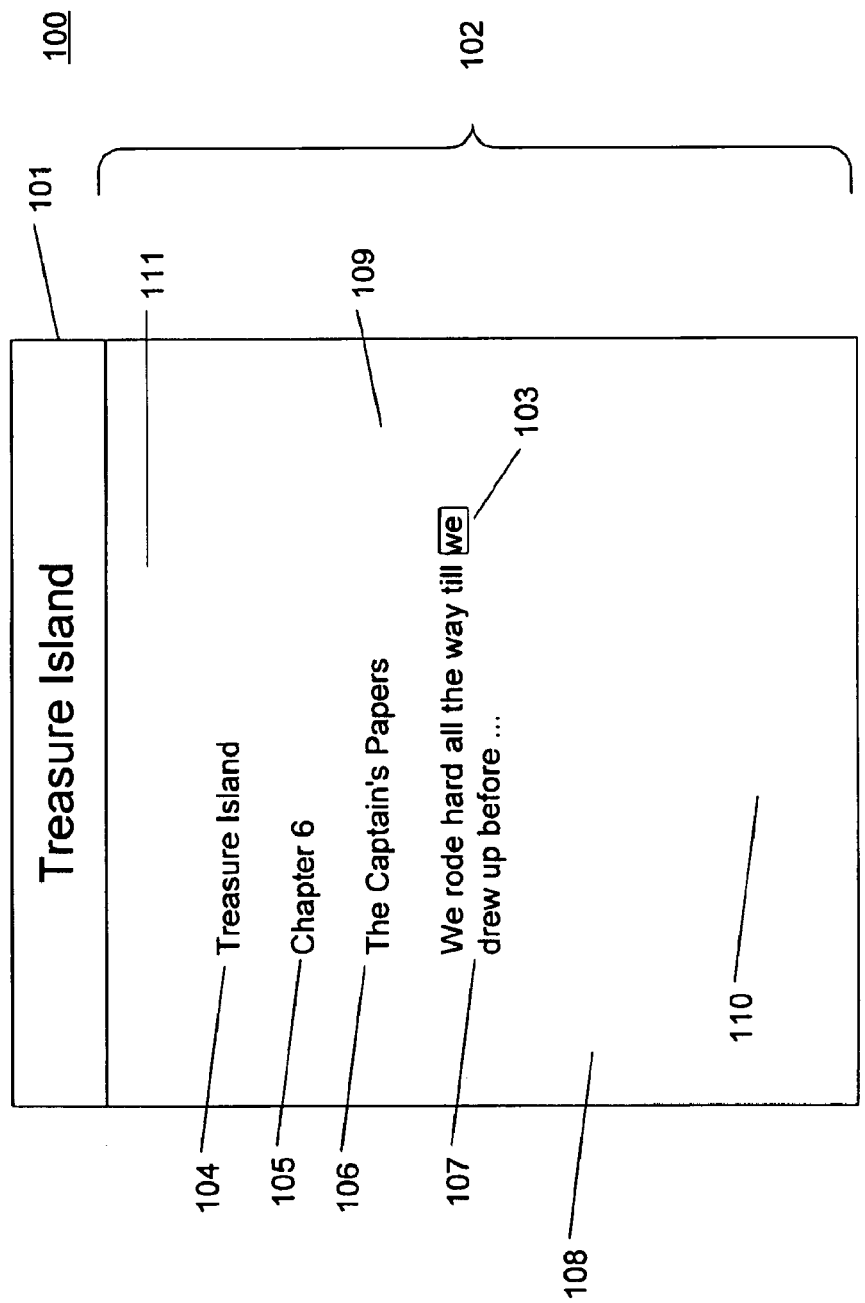
FIG. 2 shows a displayed document on a computer screen in accordance with embodiments of the present invention.

FIG. 2 shows a displayed document on a computer screen in accordance with embodiments of the present invention. As preferred, the document is displayed in a form that closely resembles the appearance of a paper equivalent of the e-book and, in this case, a paper novel. The document reader window 101 may comprise a variety of portions including a title bar 101 listing the title of the document and a body 102. In the body 102 of the display window, various portions of a document may be displayed. FIG. 2 shows an example where a title 104, a chapter number 105, a chapter title 106, and the text of the chapter 107 are displayed. Similar to an actual book, margins 108, 109, 110, and 111 appear around the displayed text. As referred to herein, the displayed elements may be independently referenced. Here for example, object 103 "we" has a drawing annotation placing a box around it as placed there by the user.

Figure 3A:
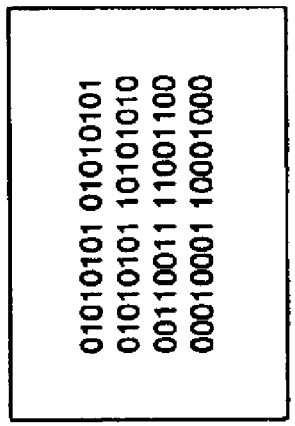
FIGS. 3A and 3B show different document formats available for storing a document in accordance with embodiments of the present invention.
Figure 3B:
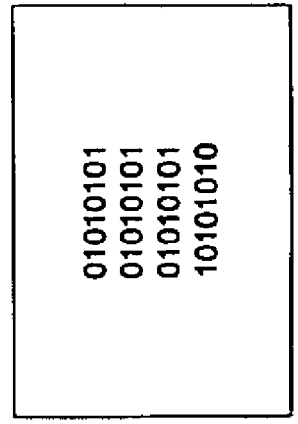

Various schemes exist with which to store electronically displayable information as shown in FIGS. 3A and 3B. With respect to the storage of text, the industry standard is Unicode UCS-2. Unicode UCS-2 encodes text using two bytes per character. The letters from the standard English alphabet to complex symbols including foreign letters and symbols are all encoded using two bytes. FIG. 3A shows a pictorial representation of a four-letter word as stored in four pairs of bytes. Another storage scheme includes UTF-8 in which standard letters (for example, US-ASCII characters) are encoded using only a single byte. Foreign characters and symbols from the Unicode UCS-2 set are encoded with two or three bytes. Part of the first byte is used to indicate how many total bytes define the complete character as shown in FIG. 3B. The remaining bytes are restricted to numeric values that cannot be confused with those used to define a single-byte character. For large texts using standard letters, a UTF8-encoded file may have a size half of that as Unicode. However, in the situation in which a number of foreign characters or symbols, the size of the stored file may actually be larger than that of Unicode due to the greater number of three byte representations of a letter or symbol. Other variable byte-length character encodings have been used in industry, for example, the Shift-JIS standard encodes characters (drawn from a smaller set than Unicode draws from) in one or two bytes. Unlike in UTF-8, the second byte of a two-byte character may contain a value that may also be used by itself to represent a single-byte character.

Figure 4:
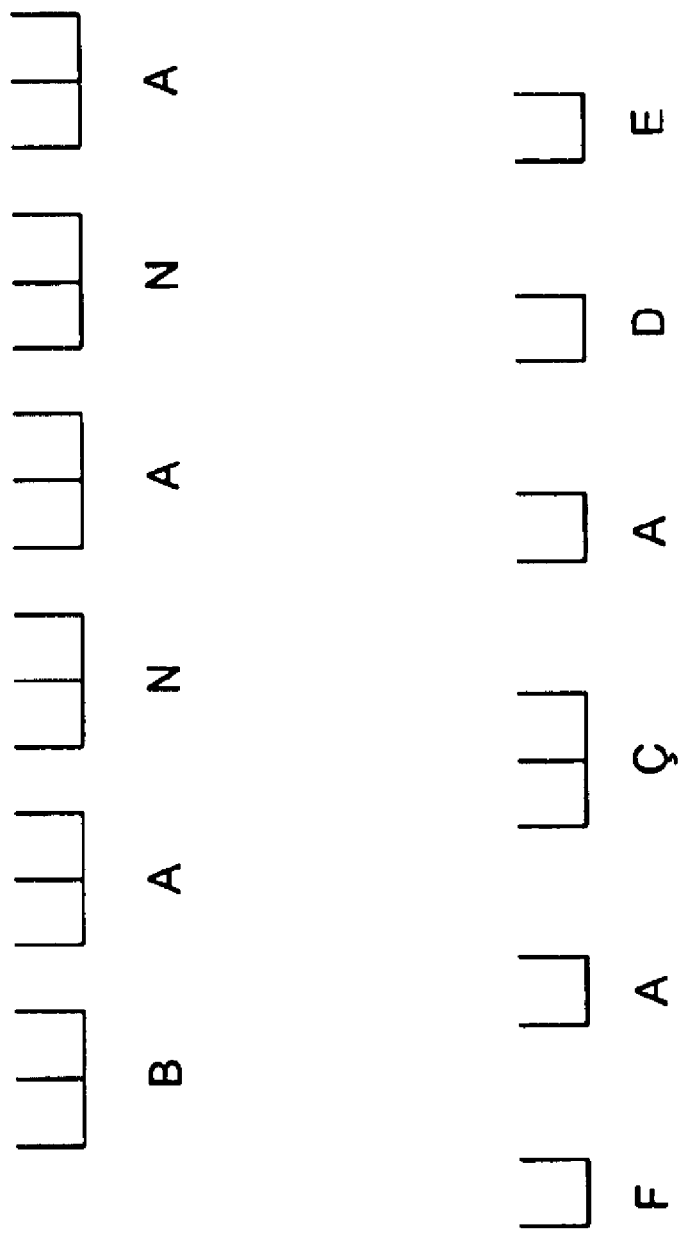
FIG. 4 shows different bytes for storing characters in UTF8 and Unicode in accordance with embodiments of the present invention.

FIG. 4 shows different bytes for storing characters in UTF8 and Unicode in accordance with embodiments of the present invention. An example of the two schemes discussed with respect to FIGS. 3A and 3B is shown in FIG. 4. The word "banana" takes twelve bytes to represent it in Unicode while only using six bytes in UTF8. The word "facade" requires twelve bytes in Unicode and seven bytes in UTF8. Other storage schemes are known in the art but not shown here for simplicity. The difference between UTF8 and Unicode is provided by way of example only and not intended to limit the invention to the use of storage scheme over the other.

The difference in the storage modes becomes relevant in the technique used to fix the file position for an annotation. If the file position is determined with one storage scheme, porting the file position to another storage scheme may not result in the same desired file position for an annotation. Thus, all annotations may be fixed to a file position based on the use of a single scheme. Preferably, the scheme used to hold the document while the document is being displayed is the scheme that is used to determine the file position. So, irrespective of whether the document is closed and compressed to another scheme, when reopened in the display scheme, the file position for the annotation remains the same as when created. Unicode may be the scheme used to display the document. Alternatively, UTF8 may be used as well as any other textual encoding or compression scheme to access the document for display.

Figure 5:
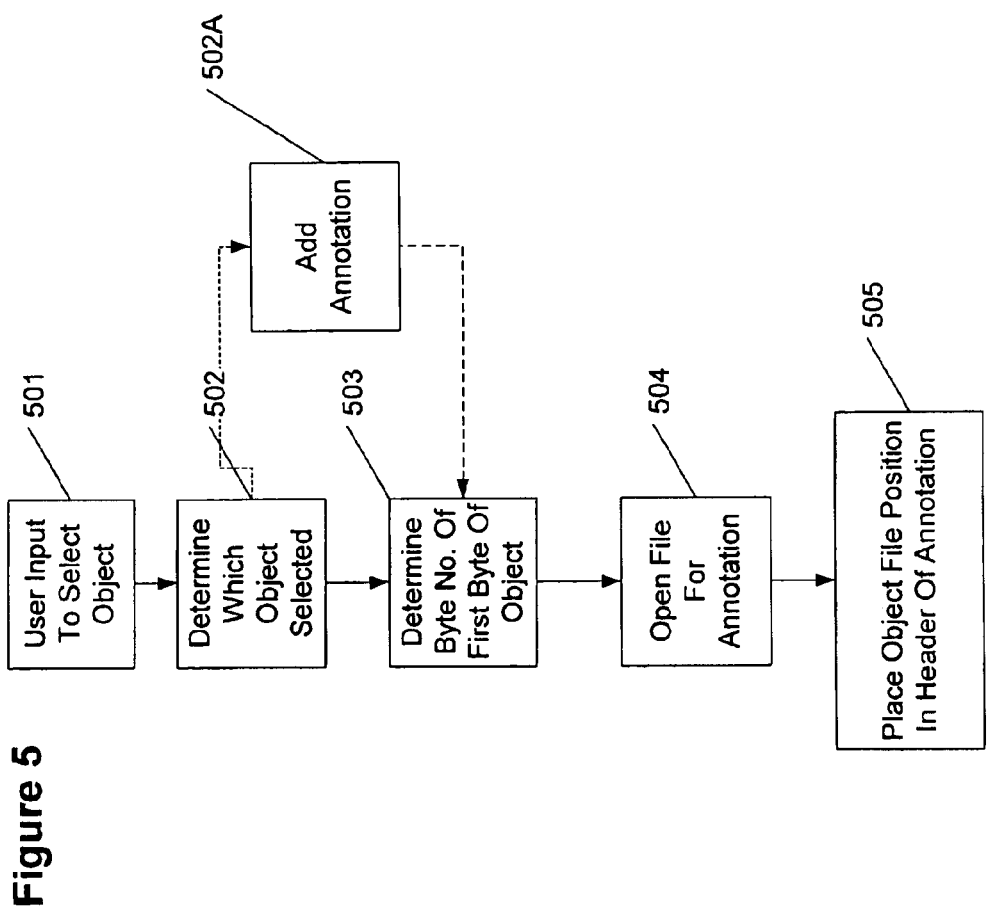
FIG. 5 shows a process for determining the file position of an object in accordance with embodiments of the present invention.

FIG. 5 shows a process for determining the file position of an object in accordance with embodiments of the present invention. In step 501, a user selects an object on the screen. The user may select the object via a cursor controlled through a mouse, touch-pad, trackball, or like pointing device. Alternatively, the user may use a stylus or finger if the surface of the display can accommodate such input.

In step 502, the system determines which object was selected by the user. This step relates to the conversion of the physical coordinates from the display device to coordinates inside the reader window. From this conversion, the object selected by the user is known.

Step 502A is optional. It relates to the user selection of an action post selection of the object. If the user is supplied with a menu after selection of the object and the function of adding an annotation is provided on the menu, step 502A relates to the selection of the adding the annotation function. An example of adding an annotation is described in detail in U.S. Ser. No. 09/455,807, filed Dec. 7, 1999, entitled "Method and Apparatus for Capturing and Rendering Text Annotations For Non-Modifiable Electronic Content" whose contents are incorporated by reference for any essential subject matter.

Step 503 relates to the determination of the file position of the selected object. The file position may include the first byte of the selected object. Alternatively, the file position may be the first byte of the last character (or even the character following the last character) of the selected object. Selecting the first byte of the first character to determine the file position provides the advantage of displaying any annotation on the page of the beginning of the object, rather then on the next page if the object spans a page. Anyone of skill in the art will appreciate that any byte of the selected object (or surrounding the selected object) may be selected to provide the file position of the object. Alternatively, one may select a line in which the object resides or the paragraph or the portion of the page (e.g., the top, middle or bottom of the page).

The file position may be determined by counting the number of bytes from some known file position to the location of, for example, the first character of the selected object. The known file position may be the beginning of the file, or may be, for example, a previously noted file position for the beginning of the current paragraph. The counting step may be performed before or after generation of the annotation. Alternatively, the counting step may be performed in the background while the annotation is being created by the user. Note that annotation file positions may always stored as UTF-8 offsets within the text, as it stood before binary compression. However, the algorithm used to display the text works with Unicode characters. Therefore, in this example, it is necessary to work back from the selected object to a character with a known UTF-8 file position.

Because the binary file-format of the original publication (electronic book, document, etc.) intermixes markup (tags) with text, it is necessary to discount the bytes taken by such tags when calculating the file-position for the selected object (to which the annotation will be anchored). However, of the said tags, many if not most do not take up a character-position on the display surface. Therefore, it is necessary to keep track of the starting file position of every run of text on the display, which corresponds to an unbroken run of text in the file. An "unbroken" run of text refers to text in the file that is not broken by a start- or an end-tag.

Therefore, the steps involved in accurately determining the file position for anchoring the annotation to the selected object are:

1) Look up in our data structures what display character position is the start of an "unbroken" run described in the preceding paragraphs.
2) Fetch from the same data structure the file-position associated with the starting display-character position.
3) Determine the string which runs from the run-start position to the selection-start position. This string contains some number of Unicode characters.
4) Determine how many UTF-8 bytes would be required to hold a UTF-8-encdoded version of the string from step 3).
5) Add the UTF-8 bytecount from step 4 to the file-position from step 2.

Step 504 relates to creating a file to persist the annotation. Wile shown after step 503, it will be appreciated that it may occur prior to or during the determination of the file position of the object. In step 505, the file position is placed in the header of the file (or portion of the file) storing the created annotation. Alternatively, the file position may be appended to the file being viewed.

Figure 6:
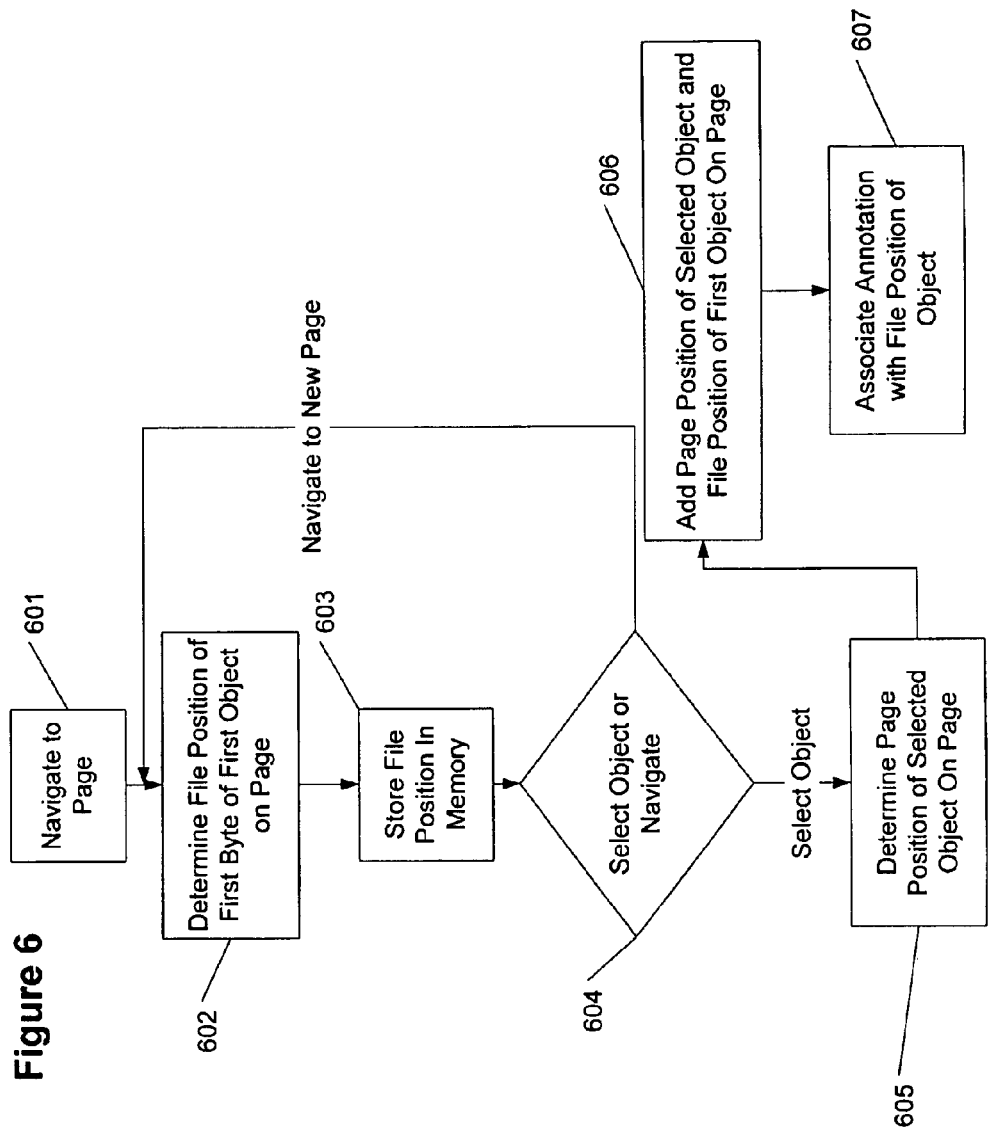
FIG. 6 shows another process for determining the file position of an object in accordance with embodiments of the present invention.

FIG. 6 shows another process for determining the file position of an object in accordance with embodiments of the present invention. As shown in step 601, a user navigates to a page. Once on the page, the system determines the file position of the first byte of the first object on the page as shown in step 602. The file position may be determined every time a new page is displayed. Alternatively, the system may pause (for example, two seconds) before starting to determine the file position for the first byte in order to allow the user to navigate to a new page before starting the file position determination. This delay provides the advantage of minimizing system workload when a user is quickly flipping pages. Once the user settles down with a given page, the system may then determine the file position of the first byte.

In step 603, the file position of the page is temporarily stored in memory.

In step 604, the system waits for either selection of an object or navigation to another page. More options are contemplated that do not need the file position for execution (for example, looking up a term in a reference document as disclosed in U.S. Ser. No. 09/455,754, filed Dec. 7, 1999, entitled "Method and Apparatus for Installing and Using Reference Materials In Conjunction With Reading Electronic Content", whose contents are incorporated herein by reference in its entirety for any enabling disclosure).

In step 605, once an object is selected, the relative position of the selected object is determined with reference to the first byte of the first object on the displayed page.

In step 606, the file position of the first byte of the first object on the page as determined in step 602 is retrieved from memory (as stored in step 603) and added to the relative position of the first byte of the selected object as determined in step 605 to determine the file position of the selected object.

In step 607, the file position of the selected object is stored along with the created annotation. These steps relating to the determination of the file position may occur before or after the annotation for the object. Alternatively, the file position may be preformed in the background while the annotation is being created. Those skilled in the art will appreciate that any number of techniques may be used to determine object position and still be considered to be within the scope of the present invention.

Figure 7:
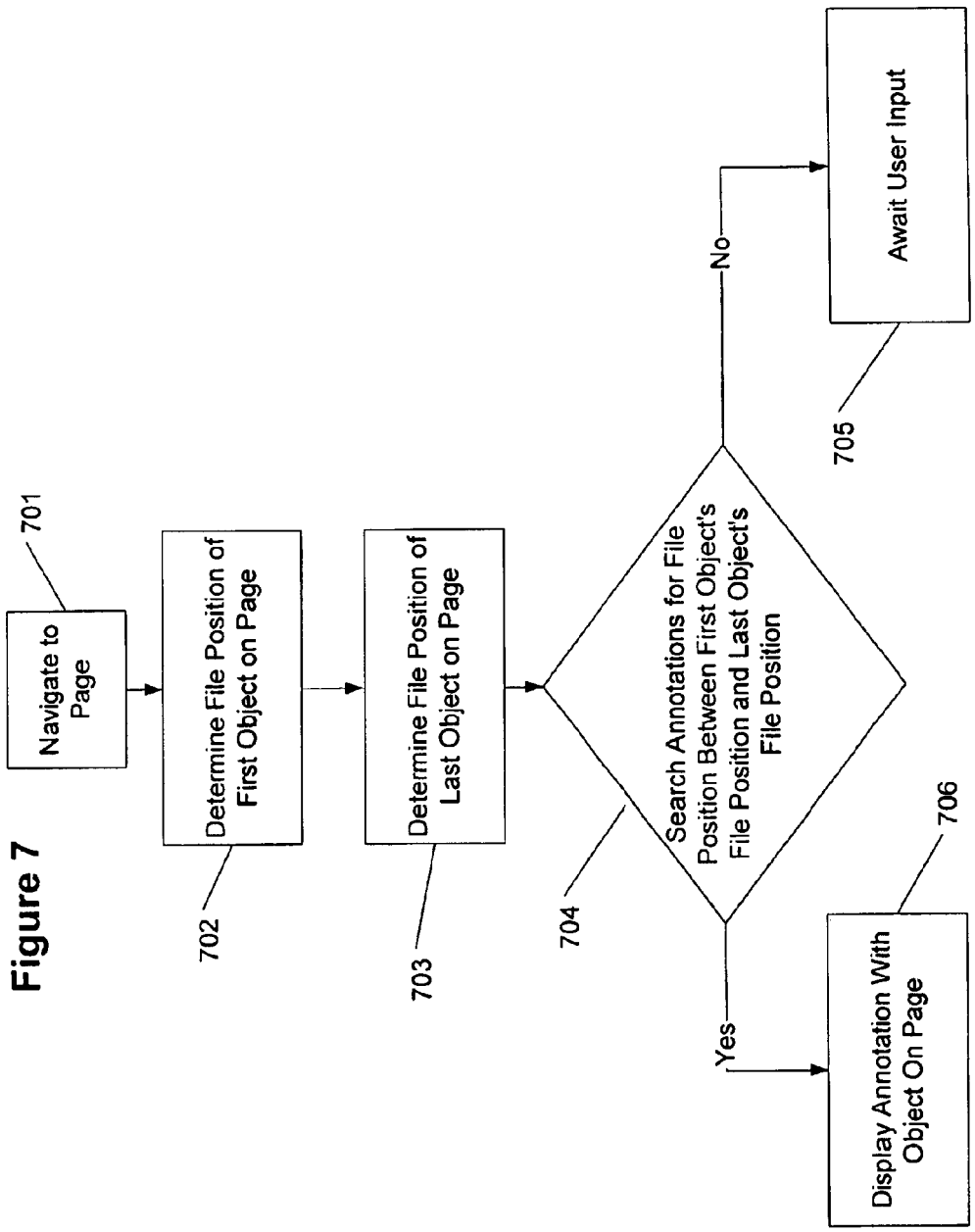
FIG. 7 shows a process for displaying annotations in accordance with embodiments of the present invention.

FIG. 7 relates to a process for displaying the created annotation when navigating to the page. In step 701, a user navigates to a page.

In step 702, the system determines the file position of the first object on the page.

In step 703, the system determines the file position of the last object on the page.

In step 704, the annotations stored for the document are searched to determine if any have file positions located between the file position determined in step 702 and the file position determined in step 703.

In step 705, if no annotations with a file position are located for display on the displayed page, the system waits for user input (including, for example, navigation to a new page or selection of an object for annotation, or any other action described herein).

In step 706, an annotation has been found that relates to an object on the page. The location of the object on the page is determined and the annotation is displayed for the object. The system for determining the location of the object may include subtracting the file position of the first object on the page from the file position of the annotated object. This difference is then used to determine how many bytes from the first character of the page is the annotated object. At this point, further annotations may be made, by returning from step 706 to step 705.

Alternatively, the system may count again from the beginning of the document to determine which object has been annotated. It will be appreciated by those skilled in the art that that numerous methods exist for displaying the annotation for the annotated object. The above examples are not intended to be limiting.

In the context of displaying the annotations that are determined to exist in a given "page" of the content (the unit of text being viewed by the user at any given time), the computer system will first validate a global state, which determines whether annotations should be rendered at all. For example, the user is provided with the ability to globally specify whether to show or hide drawing annotations (as well as text notes, bookmarks, highlights, etc.). Prior to displaying a particular annotation of an object, the computer system will check this global setting to determine whether or not to render the specific annotation. If the user has chosen to hide annotations of that particular type, the annotation will not be rendered.

FIGS. 8A and 8B show various storage techniques for storing annotations in accordance with embodiments of the present invention. FIG. 8A shows a document 801 that has modifiable (803–806) and non-modifiable (802) portions. Files of this type include Infotext file formats as are known in the art. Annotations 806 may be stored in combination with the non-modifiable content 802. An annotation 806 may be stored in a file with header 803 and body 806. The header 803 includes, for example, the file position 804 of the object with which the annotation 806 is associated. It may also include an indication of the type of annotation 806 in file portion 805. As discussed above, the annotation 806 may include a highlight, a bookmark, a drawing to be overlaid over the object, or a text annotation.

FIG. 8B shows the non-modifiable content 809 as a separate file apart from the annotation file. The annotation file 807 of FIG. 8B has similar constituent elements to that of annotation 807 of FIG. 8A. Annotation file 807 may include a file portion 808 that indicates to which non-modifiable document (here, 809) it is linked. Using the approach set forth in FIG. 8B, one file may store all annotations for a user with the non-modifiable content portions 809 being stored separately. This approach has the advantage of being able to quickly scan all annotations at one time rather than accessing all documents 801 (as including non-modifiable portions 802) to obtain all annotations stored therein.

FIG. 9 shows a display window for sorting, modifying, searching, and renaming the annotations stored in a system. The window 900 includes a title identifier 901 to alert the user that he or she is in an annotation pane 900. The window 900 may include two panes 902 and 903 (other panes may be added as needed). Panes 902 and 903 may provide a listing of annotations 904 by document. Alternatively, they may provide a listing of all annotations in a person's system. When in pane 902 (here, entitled "Notes"), the user may sort the list of annotations by type (highlight, drawing, text, bookmark). Selecting an annotation allows one to navigate to the location in the document containing the annotation. Selecting and holding the annotation allows one to remove, change the appearance of, hide or show that particular annotation, or rename the annotation. The second pane 903 (here, entitled "View") may allow a user to sort annotations based on their properties. For example, one may sort on the time created, time last accessed, by type, alphabetically, and on book order. Further, individual annotations may be switched on or off using controls on the page. Also, if all annotations have been switched off (or just those of a specific type of annotations have been switched off) and another annotation is created (or another annotation in that class), all annotations of that type may be switched back on. This may be extended to include all annotations being switched on if hidden and a new annotation added.

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer-implemented method for annotating a system having a display for displaying a page having user selectable objects being intermixed with markup tags, said user selectable objects and said markup tags being stored in a non-modifiable portion of a file, said mark-up tags bounding said user selectable objects in said file, comprising the steps of:
   receiving user input for a selection of an object of said user selectable objects on the displayed page;
   receiving user input for providing an annotation associated with said selected object; said annotation being modifiable;
   determining a position of the selected object in the non-modifiable portion of the file regardless of said markup tags bounding said selected object;
   storing the position and the annotation separately from the non-modifiable portion of the file; and
   providing a portion of said display configured for navigating to the previously selected object based on said position, when said annotation is subsequently selected.

2. The computer-implemented method according to claim 1, wherein the designation of the object is received through interaction with a stylus.

3. The computer-implemented method according to claim 1, wherein the designation of the object is received through interaction with a mouse.

4. The computer-implemented method according to claim 1, wherein the annotation is a highlight.

5. The computer-implemented method according to claim 1, wherein the annotation is a bookmark.

6. The computer-implemented method according to claim 1, wherein the annotation is a drawing.

7. The computer-implemented method according to claim 1, wherein the annotation is a text annotation.

8. The computer-implemented method according to claim 1, wherein said determining step comprises the step of:
   counting the number of bytes from the beginning of the non-modifiable portion of the file to the selected object.

9. A computer-implemented method for annotating a system having a display for displaying a page having user selectable objects, said user selectable objects stored in a non-modifiable portion of a file, comprising the steps of:

receiving user input for selection of an object of said user selectable objects on the displayed page;

receiving user input for providing an annotation being associated with said selected object;

determining a position of the selected object in the non-modifiable portion of the file;

storing the position and the annotation separately from the non-modifiable portion of the file; and providing a user selectable portion on said display configured for navigating to the previously selected object based on said position, when said annotation is displayed and subsequently selected;

wherein said determining step comprises the steps of:

counting the number of bytes from the beginning of the non-modifiable portion of the file to a first object on the displayed page;

counting the number of bytes from the first object on the displayed page to the selected object;

adding the number obtained from said first counting step to the number obtained from said second counting step to determine the file position of the selected object in said file.

10. The computer-implemented method according to claim 1, wherein said annotation is an annotation of said object.

11. A computer-readable medium having a program stored thereon, said program used in conjunction with a system having a display for displaying a page having user selectable objects being intermixed with markup tags, said user selectable objects and said markup tags being stored in a non-modifiable portion of a file, said mark-up tags bounding said user selectable objects in said file, comprising the steps of:

receiving user input for a selection of an object of said user selectable objects on the displayed page;

receiving user input for providing an annotation associated with said selected object; said annotation being modifiable;

determining a position of the selected object in the non-modifiable portion of the file regardless of said markup tags bounding said selected object;

storing the position and the annotation separately from the non-modifiable portion of the file; and providing a portion of said display configured for navigating to the previously selected object based on said position, when said annotation is subsequently selected.

12. The computer-readable medium according to claim 11, wherein the designation of the object is received through interaction with a stylus.

13. The computer-readable medium according to claim 11, wherein the designation of the object is received through interaction with a mouse.

14. The computer-readable medium according to claim 11, wherein the annotation is a highlight.

15. The computer-readable medium according to claim 11, wherein the annotation is a bookmark.

16. The computer-readable medium according to claim 11, wherein the annotation is a drawing.

17. The computer-readable medium according to claim 11, wherein the annotation is a text annotation.

18. The computer-readable medium according to claim 11, wherein said determining step comprises the step of:

counting the number of bytes from the beginning of the non-modifiable portion of the file to the selected object.

19. A computer-readable medium having a program stored thereon, said program used in conjunction with a system having a display for displaying a page having user selectable objects, said user selectable objects stored in a non-modifiable portion of a file, comprising the steps of:

receiving user input for a a selection of an object of said user selectable objects on the displayed page;

receiving user input for providing an annotation being associated with said selected object:

determining a position of the selected object in the non-modifiable portion of the file;

storing the position and the annotation separately from the non-modifiable portion of the file; and providing a user selectable portion on said display configured for navigating to the previously selected object based on said position, when said annotation is displayed and subsequently selected;

wherein said determining step comprises the steps of:

counting the number of bytes from the beginning of the non-modifiable portion of the file to a first object on the displayed page object;

counting the number of bytes from the first object on the displayed page to the selected object;

adding the number obtained from said first counting step to the number obtained from said second counting step to determine the file position of the object in said file.

20. The computer-readable medium according to claim 11, wherein the annotation is an annotation of the object.

21. A computer-implemented method for annotating an electronic book system having a display for displaying a page having user selectable objects, said user selectable objects stored in a non-modifiable portion of a file, comprising the steps of:

providing a first display portion for displaying said page of the user selectable objects;

receiving user input for a selection of an object of said user selectable objects on the displayed page;

receiving user input for providing an annotation associated with said selected object;

determining a file position of the selected object in the non-modifiable portion of the file;

storing the file position and the annotation separately from the non-modifiable portion of the file; and providing a second display portion on said display configured for navigating to the previously selected object based on said file position, when said annotation is displayed and subsequently selected.

22. A computer apparatus configured for annotating an electronic book, comprising:

a processor;

a display screen; and a memory configured to store computer executable instructions and an electronic book including a page having user selectable objects, said user selectable objects stored in a non-modifiable portion of a file, wherein said instructions cause the computer apparatus to perform the following steps:

providing a first display portion for displaying said page of the user selectable objects;

receiving user input for a selection of an object of said user selectable objects on the displayed page;

receiving user input for providing an annotation associated with said selected object;

determining a file position of the selected object in the non-modifiable portion of the file;

storing the file position and the annotation separately from the non-modifiable portion of the file; and providing a second display portion on said display configured for navigating to the previously selected object based on said file position, when said annotation is displayed and subsequently selected.

* * * * *

UNITED STATES PATENT AND TRADEMARK OFFICE
CERTIFICATE OF CORRECTION

| | |
|---|---|
| PATENT NO. | : 6,957,233 B1 |
| APPLICATION NO. | : 09/455806 |
| DATED | : October 18, 2005 |
| INVENTOR(S) | : John L. Beezer et al. |

It is certified that error appears in the above-identified patent and that said Letters Patent is hereby corrected as shown below:

On The Title Page, Item (56), under "U.S. Patent Documents", line 27, after "Bookman et al. ............." delete "204/3" and insert -- 704/3 --, therefor.

On The Title Page, Item (56), under "U.S. Patent Documents", line 52, after "Bristor" insert -- 345/840 --.

On The Title Page, Item (56), under "U.S. Patent Documents", line 58, after "Danneels" insert -- 709/49 --.

On The Title Page, Item (56), under "U.S. Patent Documents", line 59, after "Bertram et al." insert -- 715/516 --.

On The Title Page Item (56), on page 2, under "U.S. Patent Documents", line 63, after "Wen" insert -- 347/43 --.

On The Title Page, Item (56), on page 2, under "U.S. Patent Documents", line 4, after "Rangan et al." insert -- 709/217 --.

On The Title Page, Item (56), on page 2, under "U.S. Patent Documents", line 6, after "Fogg et al." insert -- 707/10 --.

On The Title Page, Item (56), on page 2, under "U.S. Patent Documents", line 19, after "Suzuki" insert -- 713/182 --.

On The Title Page, Item (56), on page 2, under "U.S. Patent Documents", line 31, after "Knowles" insert -- 704/1 --.

On The Title Page, Item (56), on page 2, under "U.S. Patent Documents", line 39, after "Kaasila" insert -- 345/611 --.

On The Title Page, Item (56), on page 2, under "U.S. Patent Documents", line 41, after "Saxton et al." insert -- 707/101 --.

On The Title Page, Item (56), on page 2, under "U.S. Patent Documents", line 53, after "Bates et al." insert -- 715/501.1 --.

On The Title Page, Item (56), on page 2, under "U.S. Patent Documents", line 54, after "Graham" insert -- 715/526 --.

UNITED STATES PATENT AND TRADEMARK OFFICE
CERTIFICATE OF CORRECTION

| | |
|---|---|
| PATENT NO. | : 6,957,233 B1 |
| APPLICATION NO. | : 09/455806 |
| DATED | : October 18, 2005 |
| INVENTOR(S) | : John L. Beezer et al. |

It is certified that error appears in the above-identified patent and that said Letters Patent is hereby corrected as shown below:

On The Title Page, Item (56), on page 2, under "U.S. Patent Documents", line 55, after "Fujimura" insert -- 715/501.1 --.

In column 1, line 14, after "Apparatus" insert -- for --.

In column 1, line 22, after "09/455,808" insert -- , --.

In column 1, line 22, after "1999" insert -- , --.

In column 1, line 23, delete "system" and insert -- System --, therefor.

In column 1, line 26, delete "system" and insert -- System --, therefor.

In column 3, line 37, after "DESCRIPTION OF" insert -- THE --.

In column 7, line 66, delete "UTF-8-encdoded" and insert -- UTF-8-encoded --, therefor.

In column 8, line 4, delete "Wile" and insert -- While --.

In column 9, line 14, delete "that" before "numerous". (second occurrence)

In column 11, line 5, in Claim 9, after "for" insert -- a --.

In column 12, line 8, in Claim 19, delete "a" before "selection". (second occurrence)

UNITED STATES PATENT AND TRADEMARK OFFICE
CERTIFICATE OF CORRECTION

PATENT NO. : 6,957,233 B1
APPLICATION NO. : 09/455806
DATED : October 18, 2005
INVENTOR(S) : John L. Beezer et al.

It is certified that error appears in the above-identified patent and that said Letters Patent is hereby corrected as shown below:

In column 12, line 12, in Claim 19, after "object" delete ":" and insert -- ; --, therefor.

Signed and Sealed this

Twenty-first Day of July, 2009

JOHN DOLL
*Acting Director of the United States Patent and Trademark Office*